(12) United States Patent
Polack

(10) Patent No.: US 11,225,131 B2
(45) Date of Patent: Jan. 18, 2022

(54) FOLDABLE VEHICLE UNDERCARRIAGE BARRIER ASSEMBLY AND METHOD OF DEPLOYMENT

(71) Applicant: John Polack, Brooklyn, NY (US)

(72) Inventor: John Polack, Brooklyn, NY (US)

(*) Notice: Subject to any disclaimer, the term of this patent is extended or adjusted under 35 U.S.C. 154(b) by 196 days.

(21) Appl. No.: 16/675,226

(22) Filed: Nov. 6, 2019

(65) Prior Publication Data

US 2021/0129649 A1 May 6, 2021

(51) Int. Cl.
*B60R 9/00* (2006.01)
*B60J 11/06* (2006.01)

(52) U.S. Cl.
CPC .................................. *B60J 11/06* (2013.01)

(58) Field of Classification Search
CPC .. B60J 11/06; B60R 9/06; B60R 11/06; B60R 13/0861; B60R 9/00
USPC ...... 224/400, 401, 29.5, 402, 403, 404, 488, 224/494, 495, 496, 497, 518; 160/135
See application file for complete search history.

(56) References Cited

U.S. PATENT DOCUMENTS

| 6,161,462 | A | * | 12/2000 | Michaelson | F41H 5/06 102/303 |
| 7,607,692 | B2 | * | 10/2009 | Adams | B62D 49/0628 220/495.01 |
| 2007/0045328 | A1 | * | 3/2007 | Smith | B60K 15/067 220/562 |
| 2009/0294497 | A1 | * | 12/2009 | Todorovic | B60R 9/02 224/402 |
| 2019/0009835 | A1 | * | 1/2019 | D'Amico | F16B 5/0072 |

* cited by examiner

*Primary Examiner* — William V Gilbert
(74) *Attorney, Agent, or Firm* — Vincent G. LoTempio

(57) ABSTRACT

A foldable vehicle undercarriage barrier assembly provides a frame that carries a foldable panel. The panel positions between the undercarriage of a vehicle and a ground surface in a friction fit relationship, so as to help restrict ingress of snow, debris, and small animals beneath the vehicle undercarriage. The panel positions perpendicularly to the ground surface, forming a barrier between the undercarriage and ground surface. The panel is vertically and horizontally expandable to accommodate different vehicle sizes and types. The panel has a joint to enable foldability. The panel comprises a handle for facilitating folding and carrying of the panel. The panel is supported by a length adjustable support pole that braces against the undercarriage or a wheel when deployed. The panel is also defined by at least one sight hole to enable viewing the space beneath the undercarriage, and verify proper alignment of the panel to the undercarriage.

18 Claims, 10 Drawing Sheets

FOLDABLE VEHICLE UNDERCARRIAGE BARRIER ASSEMBLY AND METHOD OF DEPLOYMENT

CROSS REFERENCE OF RELATED APPLICATIONS

This application claims the benefits of U.S. provisional application No. 62/793,391, filed Jan. 17, 2019 and entitled COLLAPSIBLE AND EXPANDABLE MEANS OF BLOCKING PENETRATION UNDER A VEHICLE, which provisional application is incorporated by reference herein in its entirety.

FIELD OF THE INVENTION

The present invention relates generally to a foldable vehicle undercarriage barrier assembly and method of deployment. More so, the present invention relates to at least one barrier assembly that provides a frame comprising multiple frame rods configured in a rectangular arrangement, and at least one flexible panel hingedly joined to the frame at the edges for secure positioning between the undercarriage of a vehicle and a ground surface; whereby the panel is arranged perpendicular to the ground surface and fitted to the undercarriage, so as to help restrict snow, debris, and small animals from ingression beneath the undercarriage; whereby the panel is vertically and horizontally expandable to accommodate different vehicle sizes and types; whereby the panel is defined by at least one joint to enable foldability; whereby the panel comprises a handle for facilitating folding and carrying of the panel; whereby the panel is supported by a length adjustable support pole that braces against the undercarriage or a wheel when the panel is deployed; whereby the panel is defined by at least one sight hole to enable viewing the space beneath the undercarriage, and verify proper alignment of the panel to the undercarriage; and whereby the panel is defined by at least one strap passageway configured to receive a strap subassembly that enables fastening the panel to the undercarriage, and pulling the panel from beneath the undercarriage.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, in regions with snowfall, and especially in places where snow plows attempt to remove snow from the streets, fields and driveways, frustrated vehicle owners and operators have to spend a significant amount of valuable time digging out or removing their vehicles from under piles of snow hail and compacted ice. The snow and ice can also be pushed further under vehicles by wind and snowplows making it virtually impossible for vehicle owners and operators to move their vehicles unless those elements are cleared out. Compacted snow ice and hail can also damage a vehicle's undercarriage, muffler and other mechanical under-workings resulting in a significant expense to the vehicle owner or operator. There are also significant health risks associated with under vehicle winter snow removal such as back strains, muscle pulls and broken bones resulting from falls.

Other proposals have involved barrier systems for preventing snow buildup below vehicle undercarriages, and on top of cars and windshields. The problem with these barrier systems do not expand and retract for fitting to different sizes and types of vehicles. Also, these barrier systems do not provide sight holes to view behind the barrier, or straps to move the barrier from beneath the vehicle. Even though the above cited barrier systems for preventing snow buildup meet some of the needs of the market, a foldable vehicle undercarriage barrier assembly that utilizes folding panels that can expand, retract, provide viewing beneath the undercarriage, and facilitate portability with a strap subassembly and a handle, is still desired.

SUMMARY

Illustrative embodiments of the disclosure are generally directed to a foldable vehicle undercarriage barrier assembly and method of deployment. The foldable vehicle undercarriage barrier assembly provides a frame that carries a foldable panel, with the panel being configured to securely position between the undercarriage of a vehicle and a ground surface in a friction fit relationship, so as to help restrict snow, debris, and small animals from ingression beneath the undercarriage. The panel positions perpendicularly to the ground surface, substantially forming a planar panel to across the section between undercarriage and ground surface. The panel is vertically and horizontally expandable to accommodate different vehicle sizes and types, and also to fit across the generally longer sides of the undercarriage, and the generally shorter front and rear ends of the undercarriage.

The panel is defined by at least one joint to enable foldability for stowage and carrying. The panel comprises a handle for facilitating folding and carrying of the panel. The panel is supported by a length adjustable support pole that braces against the undercarriage or a wheel when the panel is deployed. The panel is also defined by at least one sight hole to enable viewing the space beneath the undercarriage, and verify proper alignment of the panel to the undercarriage. The panel is also defined by at least one strap passageway configured to receive a strap subassembly. The strap subassembly comprises a strap and a strap anchor that enables fastening the panel to the undercarriage, and pulling the panel from beneath the undercarriage.

In another aspect, the frame comprises four outer frame rods joined at the ends.

In another aspect, the frame comprises two sets of frame rods joined with a nexus rod.

In another aspect, the at least one panel comprises two short panels and two long panels.

In another aspect, the panel folds about the frame rods for stowage.

In another aspect, the lower section of the panel hingedly joins with the frame rods.

In another aspect, the at least one sight hole forms in the upper section of the panel.

In another aspect, the assembly also includes a vertical extension panel sleeve that is slidably displaceable between a coplanar position with the panel and a parallel position with the panel.

In another aspect, the assembly also includes at least one support pole is hingedly joined with the inner face of the panel.

In another aspect, the assembly also includes a vehicle wrap at least partially encasing the panel.

In another aspect, the panel is sized and dimensioned to enable fitting between an undercarriage of a vehicle and a ground surface.

In another aspect, the outer face of the panel orients away from the space between the vehicle and the ground surface.

In another aspect, the upper section of the panel engages the undercarriage in a friction fit relationship.

In another aspect, the lower section of the panel engages the ground surface.

One objective of the present invention is to provide a lightweight, size-adjustable panel that fits beneath the undercarriage of a vehicle to prevent weather elements, humans, animals, and various sized items from penetrating underneath the vehicle.

Another objective is to block animals and humans (small children) from entering underneath a parked vehicle.

Another objective is to lightweight, easily transportable, foldable, deployable, and flexible panel that can fit beneath the undercarriage.

Yet another objective is to secure the panel to the undercarriage with a strap subassembly and/or a support pole.

An exemplary objective is to prevent theft and secure the panel to the undercarriage of the vehicle.

Yet another objective is to provide a sight hole to enable viewing the undercarriage without removing the panel.

Yet another objective is to store the panels in small spaces including in the trunk or back seat of a vehicle where space maximization is essential.

Yet another objective is to help motorists who make multiple stops in a day and who need easily deployable under vehicle blocking capability wherever they go Yet another objective is to facilitate removal of the panels from the undercarriage with a strap subassembly.

Yet another objective is to provide length adjustable and height adjustable panels that can fit at the short ends, and the long sides of the vehicle undercarriage.

Yet another objective is to provide an inexpensive to manufacture vehicle undercarriage barrier assembly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
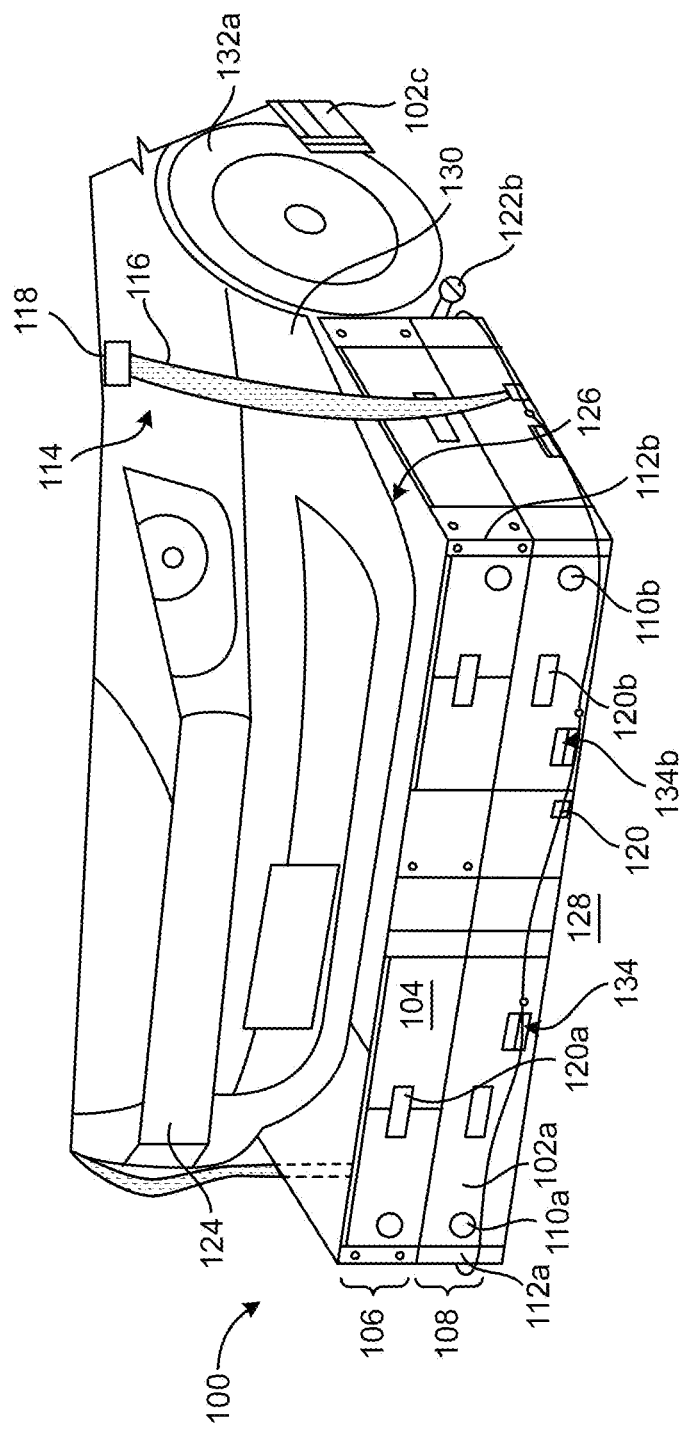
FIG. 1 illustrates a perspective view of an exemplary foldable vehicle undercarriage barrier assembly, showing an exemplary panel operational at the front end of a vehicle, extending along the front, and folding back along the joints at the panel ends to engage the vehicle wheels, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A foldable vehicle undercarriage barrier assembly 100 and method of deployment is referenced in FIGS. 1-11. The foldable vehicle undercarriage barrier assembly 100, hereafter "assembly 100" provides a unique barrier arrangement that securely fits between the undercarriage 126 of a vehicle 124 and the ground surface 128, utilizing foldable, lightweight panels operable to expand, retract, enable viewing beneath the undercarriage 126, and facilitate manipulation and portability through use of a strap subassembly and a handle. Advantageous provided by the assembly 100 are that the at least one panel 102a-d is flexible and the entirety of panels fold up flat for easy storage. And the panel 102a-d can be positioned to deploy its expansion under or beyond the circumference of most vehicles on the road. Further, the panel 102a-d and frame 200 are lightweight, facilitating vertical and horizontal adjustability.

Additional advantages are the length adjustable support pole 122a-b that, once deployed, secures the panel 102a-d to the wheels of the vehicle 124 for support, has at least one sight hole 110a, 110b molded into the panels through which visibility under the vehicle 124 for various reasons including to ensure that the device is lined up correctly under the vehicle 124, is possible. Also, the assembly 100 has the advantage of being designed to be used as a single unit as needed to protect e.g. just the front of a vehicle 124, or as a comprehensive unit with multiple foldable panels deployed around the front, back, sides of the vehicle 124.

As FIG. 1 references, the assembly 100 comprises a unique modular frame 200 that supports the other components of the invention. The frame 200 is unique shaped to pivotally carry at least one foldable panel 102a-d that securely fits between the undercarriage 126 of the vehicle 124 and the ground surface 128—often in a friction fit relationship. In one possible embodiment, the frame 200 comprising multiple frame rods 202a-h configured to join at their ends in a substantially rectangular arrangement. The frame rods 202a-h are pivotable, flexible, and lightweight, to facilitate carrying and stowage when not in operation.

In one possible embodiment of the frame 200, at least one rod length extender 220a-d works to telescopically enable extension and retraction of individual frame rods 202a-h. The rod length extender 220a, 220b, 220c, 220d may include a rod having a smaller diameter than the frame rods 202a-h, enabling the frame rods to receive the rod length extender 220a-d for slidable displacement thereupon. The rod length extender 220a-d may include lightweight hollow plastic such as that found in a PVC pipe.

In some embodiments, the frame rods 202a-h may be cylindrical shaped PVC pipe, or a more rigid material having an elongated rectangular shape, for example. In another embodiment, the frame 200 and panel 102a-d is fabricated from lightweight hollow plastic such as that found in a ½" PVC pipe. However, in other embodiments, different materials, including, polyurethane, polyethylene, aluminum, metal alloys, wood, and rubber may also be used for fabrication of the frame 200 and other components of the assembly 100.

In one non-limiting embodiment, the frame 200 comprises four outer frame rods 202a-h joined at the ends. In yet another embodiment, the frame 200 comprises two sets of frame rods 202a-h joined with a nexus rod 204. However, the two sets of frame rods 202a, 202b, 202c, 202d, and 202e, 202f, 202g, 202h may be welded together, or may simply join at a hinge that enables foldability for stowage. Each set of frame rods 202a-d, 202e-h. As discussed above, the frame 200 is utilized primarily to pivotally carry at least one panel 102a-d. The frame 200 provides a solid framework upon which the panels 102a-d folds flat onto (stowage position) or are supported in a perpendicular orientation thereto (operational position FIG. 1).

While connected to the frame 200, the panel 102a-d folds about the frame rods 202a-h for stowage. In essence, the panel 102a-d is a flat, elongated planar member that is configured to be folded at two ends, extend vertically with a horizontal sleeve, folds flat for stowage, provide sight hole 110a, 110bs for viewing beneath the undercarriage 126, and facilitates carrying and position with at least one handle and a strap subassembly that works with the panel 102a-d.

Figure 2:
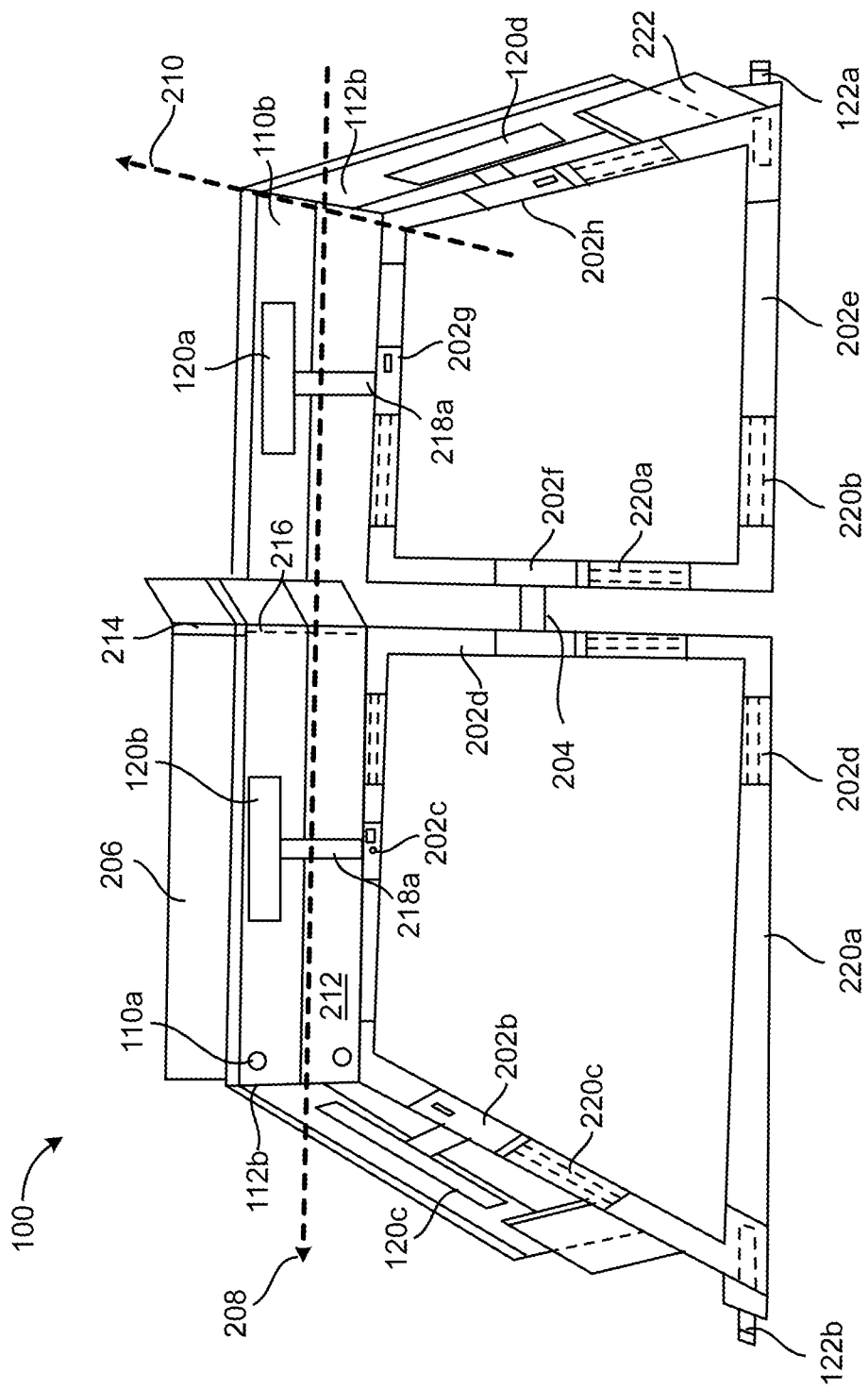
FIG. 2 illustrates a perspective view of the foldable vehicle undercarriage barrier assembly shown in FIG. 1, showing an exemplary frame carrying the panel, in accordance with an embodiment of the present invention.

Thus, as FIG. 2 shows, the panel 102a-d is sized and dimensioned to enable fitting between an undercarriage 126 of a vehicle 124 and a ground surface 128. The panel 102a-d is defined by an inner face 212 and an outer face 104. In one embodiment, the outer face 104 orients away from the space that forms between the undercarriage 126 and the ground surface 128. Conversely, the inner face 212 orients to face the space that forms between the undercarriage 126 and the ground surface 128.

Figure 8:
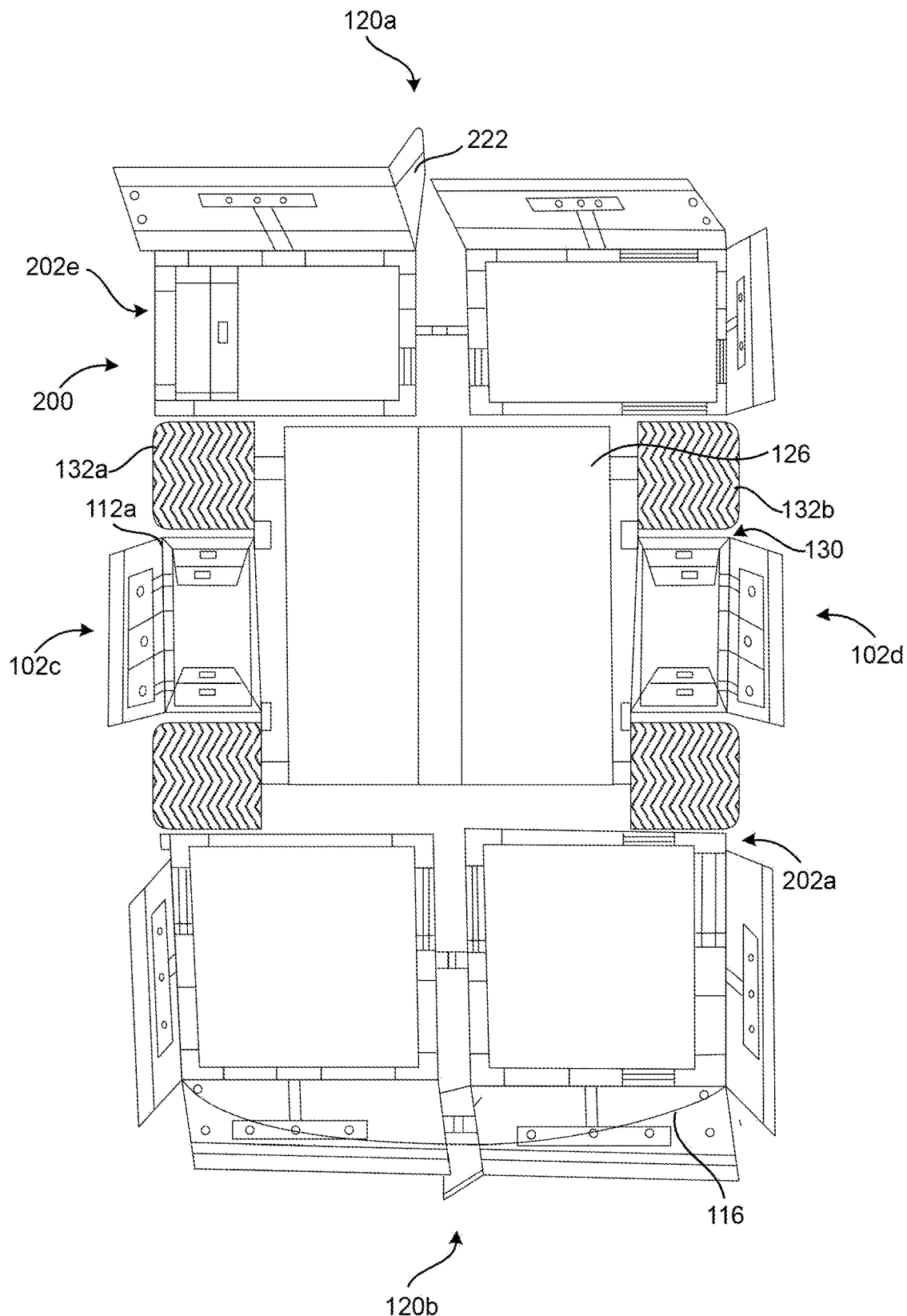
FIG. 8 illustrates a top view of the foldable vehicle undercarriage barrier assembly fitted to the undercarriage of the vehicle, in accordance with an embodiment of the present invention.

In some embodiments, the assembly 100 provides two panels 102a, 102b that are length adjusted to extend the length of a front and rear end of a vehicle 124. The assembly 100 also provides a pair of side panels 102c, 102d length adjusted to extend the length of the sides of the vehicle 124. As FIG. 8 illustrates, the side panels are longer than the front and rear panels. This accommodates for the fact that most vehicle 124s are longer, than they are wide. However, in some embodiments, the panels are length adjustable, allowing for a single panel of one size to be used with the front, rear, and sides of the undercarriage 126 of the vehicle 124. In one non-limiting embodiment, the at least one panel 102a-d comprises two short panels 102a, 102b and two long panels 102c, 102d. The short panels 102a-b are sized to rest under the front and/or rear ends of the vehicle 124; while the long panels 102c-d rest along the sides of the vehicle 124 undercarriage 126.

The panel 102a-d positions perpendicularly to the ground surface 128, substantially forming a planar panel 102a-d to across the section between undercarriage 126 and ground surface 128, so as to help restrict snow, debris, and small animals from ingression beneath the undercarriage 126. The panel 102a-d is vertically and horizontally expandable to accommodate different vehicle 124 sizes and types, and also to fit across the generally longer sides of the undercarriage 126, and the generally shorter front and rear ends of the undercarriage 126. In some embodiments, the at least one panel 102a-d comprises two short panels and two long panels. The short panels may be up to 3 meters long and sized for the front or rear ends of the vehicle 124.

As discussed above, the panel 102a-d is foldable for stowage and portability. In one embodiment, the panel 102a-d is hingedly joined to the frame rods 202a-h, whereby the panel 102a-d folds about the frame rods 202a-h along a horizontal axis 208. In some embodiments, the panel 102a-d may have, integral therein, at least one joint 112a, 112b traversing the upper and lower sections 106, 108. The joint 112a-b allows the panel 102a-d to be folded along the vertical axis 210.

In one embodiment, two joints 112a, 112b form proximal to the ends of the panel 102a-d, such that the panel 102a-d folds inwardly at the ends to engage the wheels of the vehicle 124. For example, FIG. 1 shows the panel operational at the front end of the vehicle, extending along the front, and folding back along the joints at the panel ends to engage the vehicle wheels. Both the joins, and the pivotal configuration between the panel 102a and frame rods 202a-h allow the assembly 100 to be folded completely flat for stowage in the trunk of the vehicle 124. As illustrated, FIG. 6 illustrates a perspective view of the assembly 100 with folded panels in FIG. 5, being stowed in the trunk of the vehicle 124.

Figure 3:
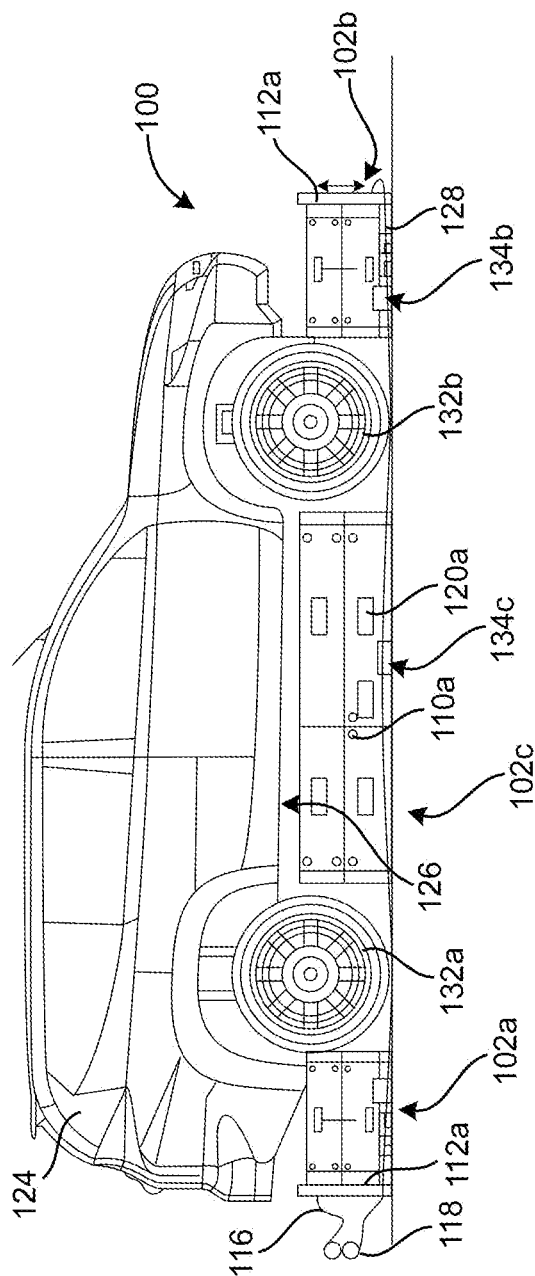
FIG. 3 illustrates an elevated side view of the foldable vehicle undercarriage barrier assembly in an operational position beneath the undercarriage of the vehicle, in accordance with an embodiment of the present invention.

Turning now to FIG. 3, the panel 102a-d may be defined by a flexible upper section 106 that orients towards the undercarriage 126 of the vehicle 124, and an opposing lower section 108 that engages the ground surface 128 while in the operational position. However, in other embodiments, the lower section 108 of the panel 102a-d hingedly joins with the frame rods 202a-h and/or the ground surface 128. In this manner, the panel 102a-d can fold into a compact form when not being used.

The upper section 106 of the panel 102a-d engages the undercarriage 126 in a friction fit relationship. The flexible characteristics of the upper section 106 enables bending/flexing to adjustably fit against the undercarriage 126. Thus, the panel 102a-d can be pushed beneath the undercarriage 126 and be force-fit due to the advantage provided by having a flexible upper section 106.

Figure 5:
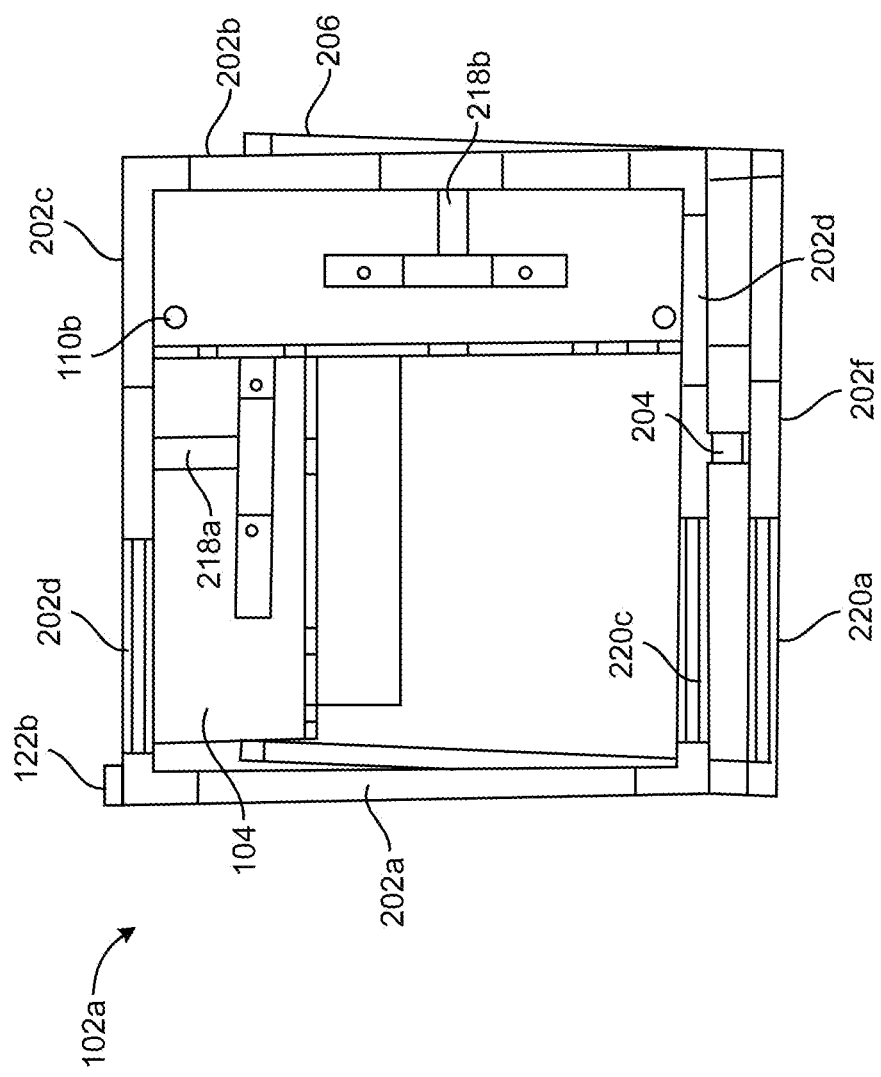
FIG. 5 illustrates a top view of the panels shown in FIG. 4, being fully folded into a stowage position, in accordance with an embodiment of the present invention.
Figure 6:
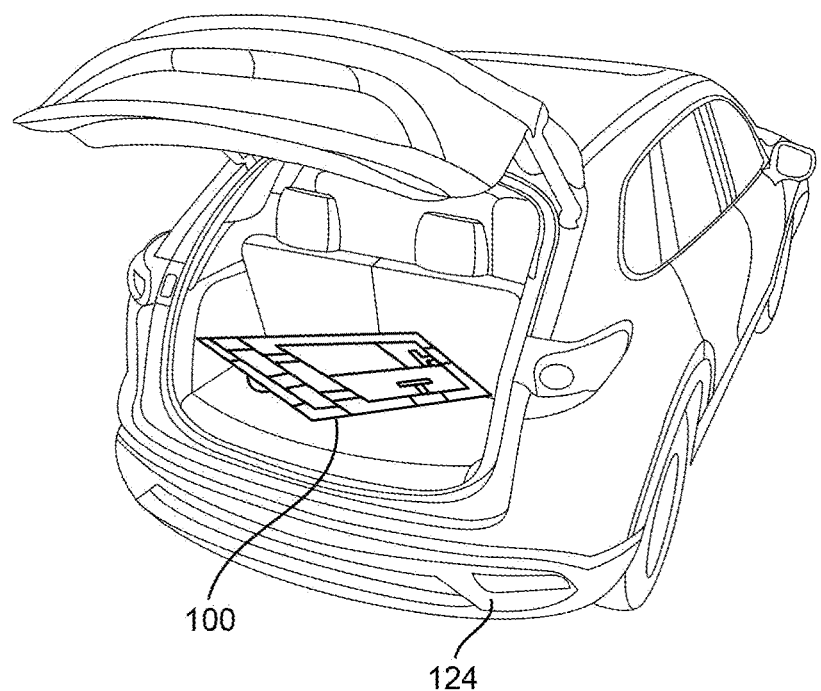
FIG. 6 illustrates a perspective view of the foldable vehicle undercarriage barrier assembly from FIG. 5 being stowed in the trunk of the vehicle, in accordance with an embodiment of the present invention.

Turning now to FIG. 5, the panel 102a-d is also defined by at least one sight hole 110a, 110b. The at least one sight hole 110a, 110b forms in the upper section 106 of the panel 102a-d. In some embodiments, two sight hole 110a, 110bs form on opposite ends of the upper section 106 of the panel 102a-d. In yet another embodiment, panel comprises a vertically extending, semi-circular shaped shield extension. The shield extension serves to at least partially covering the wheel of the vehicle 124.

For providing fastenability for the panel 102a-d further being defined by at least one strap passageway. The strap anchor is operable to detachably fasten to the undercarriage 126 or a wheel of the vehicle 124. The strap anchor may include a safety hook, a magnet, a clamp, or other fastening mechanism known in the art of automotive accessories.

Figure 4:
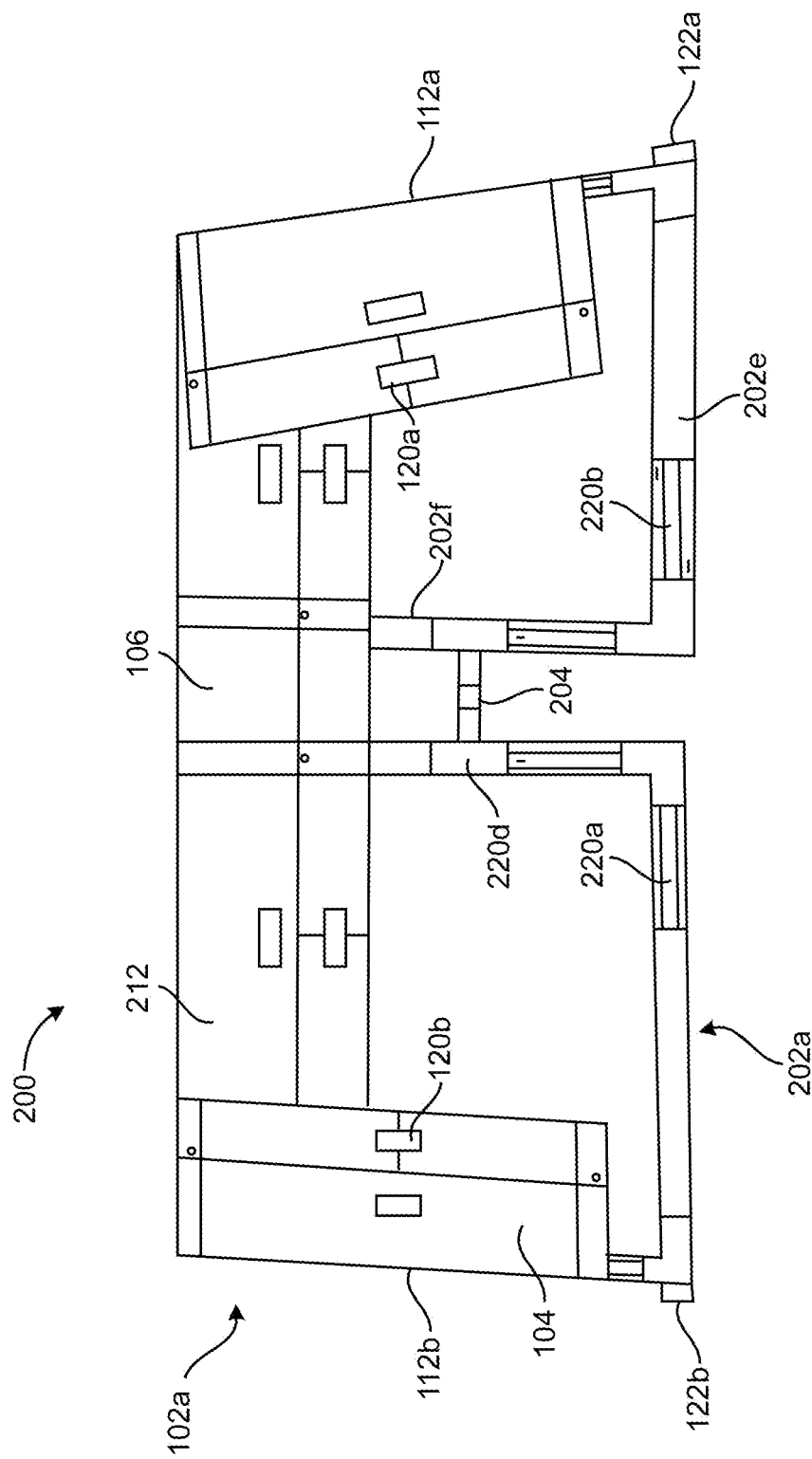
FIG. 4 illustrates a top view of the foldable vehicle undercarriage barrier assembly, showing the panels partially folded, in accordance with an embodiment of the present invention.

As FIG. 4 shows, at least one handle 120a, 120b, 120c, 120d joined to the outer face 104 of the panel 102a-d. The handle may be molded and integral to the panel 102a-d. In other embodiments, the handle 120a-d may be a curved component that attaches to the panel 102a-d. Through use of the handle 120a, the panel 102a-d can be manually pulled down to the ground with a slide handle mechanism, or automatically activated by an electronic mechanism, to extend the panel 102a-d to engage the ground surface 128.

Figure 7:
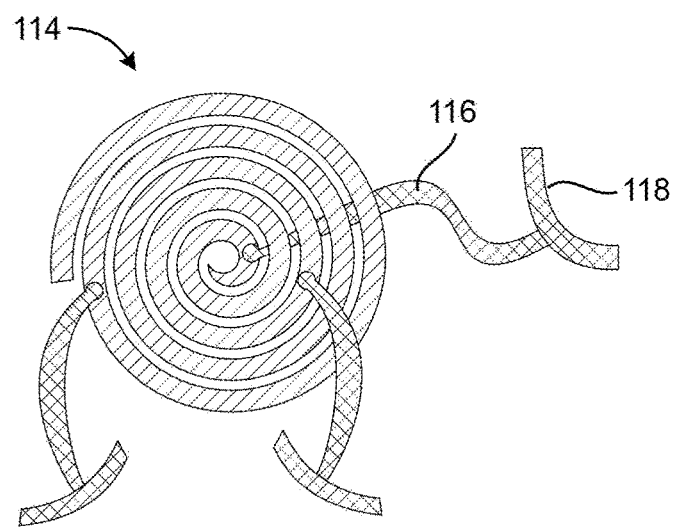
FIG. 7 illustrates a perspective view of an exemplary strap subassembly, in accordance with an embodiment of the present invention.

Continuing with the mobility aspects of the panels 102a-d, a strap subassembly 114 is operatively connected to the panel 102a-d. The strap subassembly 114 works to enable secure fastening of the panels 102a-d to the undercarriage 126. The strap subassembly 114 also serve to facilitate removal of the panels 102a-d from beneath the undercarriage 126 after finishing operations. As FIG. 7 illustrates, the strap subassembly 114 comprises an elongated, flexible strap 116 and a strap anchor 118. The strap is sized and dimensioned to pass through the strap passageway 134a, 134b, 134c, encircling the entirety of the panels 102a-d while operational beneath the undercarriage 126 of the vehicle 124.

In one embodiment, the strap anchor 118 detachably fastens to the undercarriage 126 of at least one wheel 132a, 132b of the vehicle 124. The panel 102a-d is defined by at least one strap passageway 134a-c is sized and dimensioned to receive a strap 116 from a strap subassembly 114. In this manner, the strap 116 and strap anchor 118 enable fastening the panel 102a-d to the undercarriage 126 and pulling the panel 102a-d from beneath the undercarriage 126.

The assembly provides numerous components that enhance the rigidity and structural integrity of the panel. In one embodiment, at least one integrated panel support member 218a, 218b traverses the panel 102a-d. The integrated panel support member 218a, 218b, shown in FIGS. 2 and 5, may be more rigid than the panel 102a. In one embodiment, the integrated panel support member 218a, 218b is a T-shaped bar.

Figure 10:
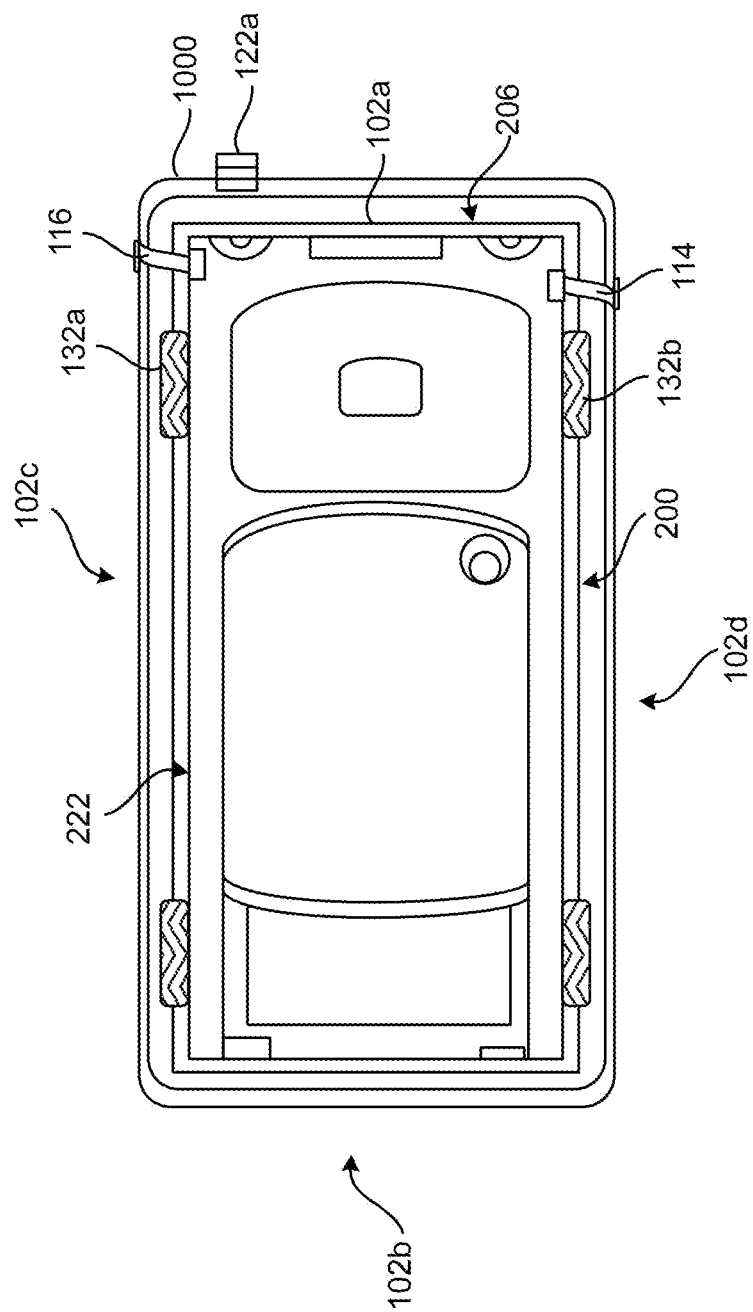
FIG. 10 illustrates a top view of the foldable vehicle undercarriage barrier assembly fully fitted to the vehicle in an operation position, in accordance with an embodiment of the present invention.

In other embodiments, the assembly 100 comprises a vehicle wrap 1000 that at least partially encases the panel 102a-d (FIG. 10). The vehicle wrap 1000 serves to help prevent theft and to secure the under panel 102a-d to the undercarriage 126 of the vehicle 124. Thus, the integrated panel support member 218a, 218b, the strap subassembly 114, and the vehicle wrap 1000 can be utilized, serving as a security feature.

In some embodiments, shown back in FIG. 2, the panel can be increased in height or width through use of a vertical extension panel sleeve 206 and/or a horizontal extension panel sleeve 222. The vertical extension panel sleeve 206 enables vertical extension of the panel 102a-d. The vertical extension panel sleeve 206 is slidably displaceable between a coplanar position with the panel 102a-d (extended) and a parallel position with the panel 102a-d (retracted).

In one embodiment, the vertical extension panel sleeve 206 comprises a rail 214 that rides along a sleeve, or groove 216 that forms in the inner face 212 of the panel 102a-d. In yet another embodiment, the vertical extension panel sleeve 206 comprises a vertically extending, semi-circular shaped shield extension 130 that is sized and dimensioned to at least partially covering the wheel of the wheels 132a, 132b of the vehicle 124. Similarly, the assembly 100 further comprises a horizontal extension panel sleeve 222 that enables horizontal extension of the panel 102a, slidably extending and retracting from the lateral sides of the panel 102a.

In an additional component of stability, the assembly 100 provides at least one support pole 122a, 122b extending from the inner face of the panel. The support pole 122a-b serves as a brace, supporting the panel 102a-d against the wheel of the vehicle 124 while the panel 102a-d rests upright beneath the undercarriage 126 and the ground surface 128. The support pole 122a-b can be especially helpful when a significant buildup of weather elements is pushed against the front face of the panel 102a-d during inclement weather, such as strong winds.

Figure 9:
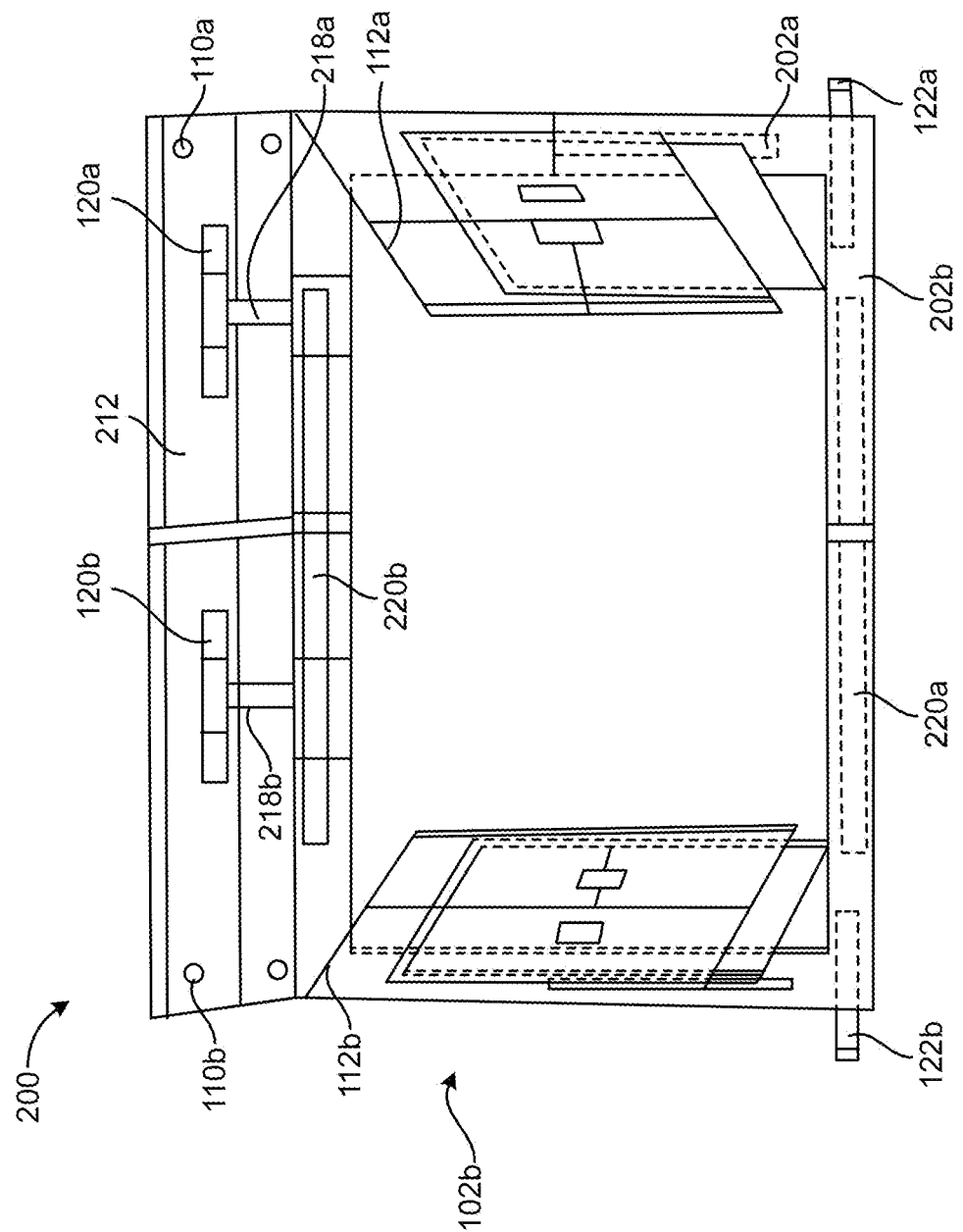
FIG. 9 illustrates a top view of the foldable vehicle undercarriage barrier assembly, in accordance with an embodiment of the present invention.

As FIG. 9 illustrates, the support pole 122a may telescopically extend and retract. Additionally, the support pole 122a-b is hingedly joined with the inner face 212 of the panel 102a-d. In another embodiment, the support pole may have a rubber foot at the terminus to prevent movement when supporting the panel 102a-d beneath the undercarriage 126.

Figure 11:
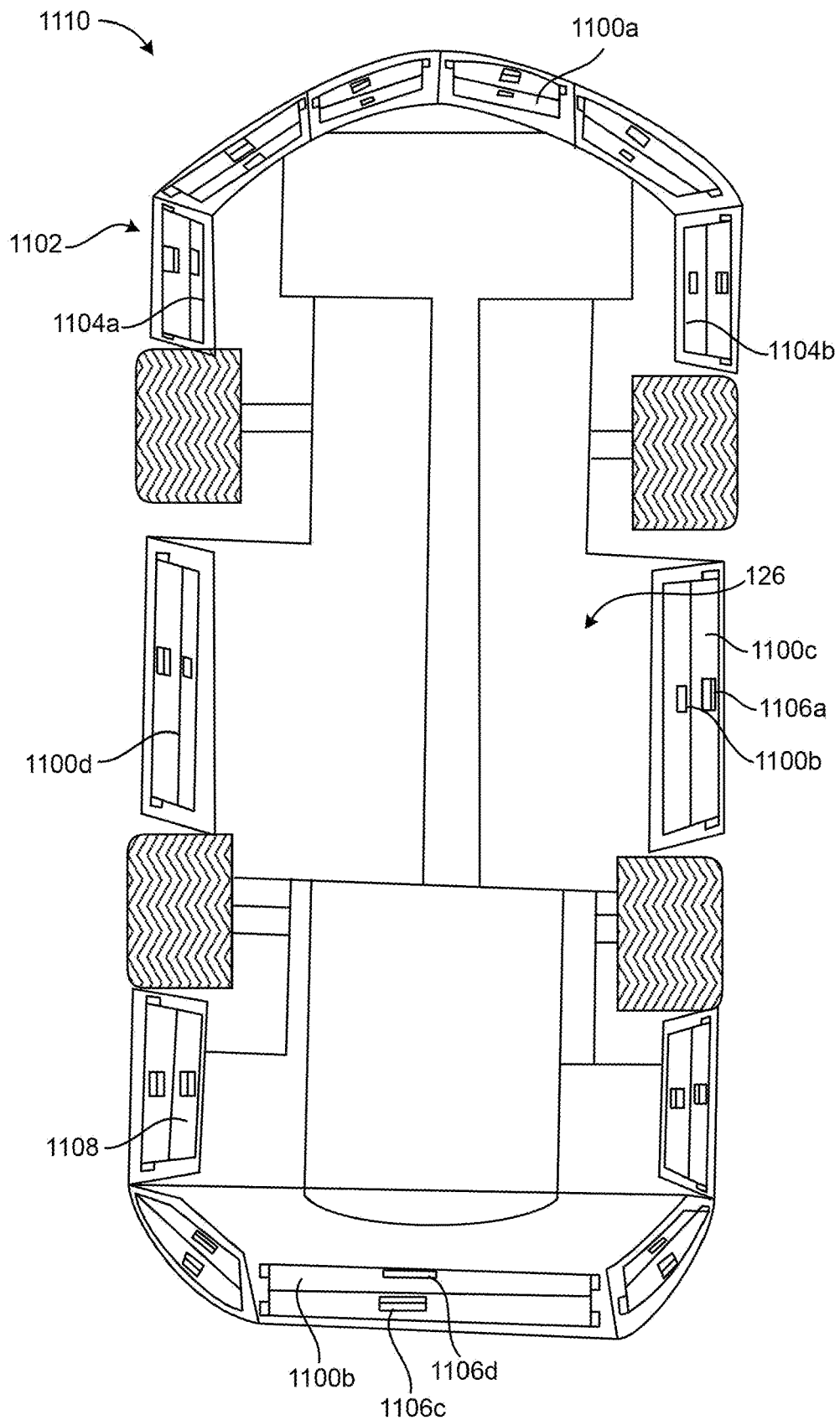
FIG. 11 illustrates a top view of an alternative embodiment of an integral foldable vehicle undercarriage barrier assembly, showing the panels integral with the vehicle, in accordance with an embodiment of the present invention.

In an alternative embodiment of an integral foldable vehicle undercarriage barrier assembly 1110, shown in top and bottom views of the vehicle 124 in FIG. 11, the panels 1100a-d are integral with the vehicle 124, whereby four panels 1100a, 1100b, 1100c, 1100d slide in a first direction to engage the lower section 108 with the ground surface 128, and a second direction to position the panels 1100a-d parallel with the undercarriage 126. This sliding motion can be articulated with through automation, rather than manually lifting and locking the panels into place along the undercarriage 126.

In the automated configuration of a, a motor and gear system, known in the art, operatively connect to the panels 1100a-d, enabling a vertical displacement thereof. A remote controller operatively connected to the motor, and disposed outside the vehicle; or an internal controller operatively connected to the motor, and disposed inside the vehicle 124, regulate slidable displacement of the panels 1100a-d in the first and second directions. And as in the first configuration of the assembly, a frame 1102 comprising multiple frame rods 1104*a*, 1104*b* provides structural integrity to the panels 1100*a-d*. Further, at least one handle 1106*a*, 1106*b*, 1106*c*, 1106*d* allows for removal of the panels from the vehicle for maintenance and cleaning. And the panels 1100*a-d* can still be increased in height or width through use of a vertical extension panel sleeve 1108.

In another alternative embodiment, the panel 102*a-d* is configured to automatically or manually activate by an electronic LCD, push button, mobile app, or remote-controlled means or by a manual means, to fold out by a mechanical hinge from underneath one or all sides of the undercarriage 126. This allows the panels to deploy to the surface under the vehicle 124 to help prevent weather elements, humans, and animals from positioning beneath the vehicle 124.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A foldable vehicle undercarriage barrier assembly, the assembly comprising:
    a frame comprising multiple frame rods configured in a rectangular arrangement;
        at least one panel defined by an inner face and an outer face, the at least one panel being hingedly joined to the frame rods, whereby the panel folds about the frame rods along a horizontal axis,
        the at least one panel further being defined by a flexible upper section, and a lower section, the at least one panel comprising at least one joint traversing the upper and lower sections, whereby the at least one panel folds along a vertical axis,
        the at least one panel further being defined by at least one sight hole,
        the at least one panel further being defined by at least one strap passageway;
    at least one handle joined to the outer face of the at least one panel; and
    a strap subassembly comprising a strap and a strap anchor, the strap being sized and dimensioned to pass through the strap passageway.

2. The assembly of claim 1, wherein the multiple frame rods comprises four outer frame rods.

3. The assembly of claim 1, wherein the multiple frame rods comprises two sets of frame rods joined with a *nexus* rod.

4. The assembly of claim 1, wherein the foldable vehicle undercarriage barrier assembly has a front end, a rear end, a first side and a second side and wherein the at least one panel comprises a front end panels attached to the front end of the foldable vehicle undercarriage barrier assembly and rear end panel attached to the rear end of the foldable vehicle undercarriage barrier assembly and a first side panel attached to the first side of the vehicle undercarriage barrier assembly and a second side panel attached to the second side of the vehicle undercarriage barrier assembly.

5. The assembly of claim 1, wherein the panel folds about the frame rods for stowage.

6. The assembly of claim 1, wherein the at least one sight hole forms in the upper section of the panel.

7. The assembly of claim 1, further comprising a vertical extension panel sleeve and a horizontal extension panel sleeve, the extension panel sleeves being slidably displaceable between a coplanar position with the panel and a parallel position with the panel.

8. The assembly of claim 1, further comprising at least one support pole, the support pole being hingedly joined with the inner face of the panel.

9. The assembly of claim 1, further comprising a vehicle wrap, the vehicle wrap at least partially encasing the panel.

10. The assembly of claim 1, wherein the panel is sized and dimensioned to enable fitting between an undercarriage of a vehicle and a ground surface, whereby the upper section of the panel is positioned proximate to the undercarriage and whereby the lower section of the panel engages the ground surface.

11. The assembly of claim 10, wherein the outer face orients away from the space between the vehicle and the ground surface.

12. The assembly of claim 11, wherein the strap anchor detachably fastens to the undercarriage or a wheel of the vehicle.

13. The assembly of claim 12, wherein panel comprises a vertically extending, semi-circular shaped shield extension, the shield extension at least partially covering the wheel of the vehicle.

14. The assembly of claim 13, wherein the flexible upper section flexes to adjustably fit against the undercarriage.

15. The assembly of claim 14, wherein the panel is integral with the vehicle, whereby the panel slides in a first direction to engage the lower section with the ground surface, and a second direction to position the panel parallel with the undercarriage.

16. A foldable vehicle undercarriage barrier assembly, the assembly comprising:
    a frame comprising multiple frame rods configured in a rectangular arrangement;
        at least one rod length extender connecting at least two of the frame rods;
        at least one panel defined by a flexible upper section, and a lower section,
        whereby the flexible upper section is sized to fit below the undercarriage, the at least one panel further being defined by an inner face and an outer face, the lower section of the at least one panel being hingedly joined to the frame rods, whereby the at least one panel folds about the frame rods along a horizontal axis,
        the at least one panel comprising at least one joint traversing the upper and lower sections, whereby the at least one panel folds along a vertical axis, the at least one panel further being defined by at least one sight hole, the at least one panel further being defined by at least one strap passageway;
    at least one handle joined to the outer face of the at least one panel;
    a strap subassembly comprising a strap and a strap anchor, the strap being sized and dimensioned to pass through the strap passageway;
    a vertical extension panel sleeve, the vertical extension panel sleeve being slidably displaceable between a coplanar position with the panel and a parallel position with the at least one panel, the vertical extension panel sleeve comprising a rail that rides along a groove in the inner face of the at least one panel;

a horizontal extension panel sleeve, the horizontal extension panel sleeve being slidably displaceable between a coplanar position with the panel and a parallel position with the at least one panel; and at least one support pole, the support pole being hingedly joined with the inner face of the at least one panel.

17. The assembly of claim 16, wherein the panel is sized and dimensioned to enable fitting between an undercarriage of a vehicle and a ground surface, whereby the upper section of the at least one panel is positioned proximate to the vehicle undercarriage, and whereby the lower section of the at least one panel engages the ground surface.

18. A foldable vehicle undercarriage barrier assembly, the assembly comprising:
- a frame comprising four frame rods joined together to form a rectangular arrangement;
    - at least one rod length extender connecting at least two of the frame rods, the frame rods and the rod length extender having a slidable, telescopic relationship;
    - at least one panel defined by a flexible upper section, and a lower section, whereby the flexible upper section is sized to adjustably fit proximate to the undercarriage, the at least one panel further being defined by an inner face and an outer face, the lower section of the panel being hingedly joined to the frame rods, whereby the at least one panel folds about the frame rods along a horizontal axis, the at least one panel comprising at least one joint traversing the upper and lower sections, whereby the at least one panel folds along a vertical axis, the at least one panel further being defined by at least one sight hole, the at least one panel further being defined by at least one strap passageway;
- at least one integrated panel support member traversing the at least one panel;
- a vehicle wrap at least partially encasing the at least one panel;
- at least one handle joined to the outer face of the at least one panel;
- a strap subassembly comprising a strap and a strap anchor, the strap being sized and dimensioned to pass through the strap passageway;
- a vertical extension panel sleeve, the vertical extension panel sleeve being slidably displaceable between a coplanar position with the panel and a parallel position with the panel;
- a horizontal extension panel sleeve, the horizontal extension panel sleeve being slidably displaceable between a coplanar position with the panel and a parallel position with the at least one panel; and at least one support pole, the support pole being hingedly joined with the inner face of the at least one panel.

* * * * *